United States Patent [19]

Bollen et al.

[11] Patent Number: 4,568,505

[45] Date of Patent: Feb. 4, 1986

[54] PROCESS TO PRODUCE SHEET MOLDING COMPOUND USING A POLYAMIDE RELEASE FILM

[75] Inventors: P. Stuart Bollen, Auburn; Alfieri Degrassi, Pottsville, both of Pa.; William Sacks, Gillette, N.J.

[73] Assignee: Allied Corporation, Morris Township, Morris County, N.J.

[21] Appl. No.: 572,778

[22] Filed: Jan. 23, 1984

Related U.S. Application Data

[60] Division of Ser. No. 218,888, Dec. 22, 1980, Pat. No. 4,444,829, which is a continuation of Ser. No. 83,502, Oct. 10, 1979, abandoned.

[51] Int. Cl.[4] ............................................. B29B 7/52
[52] U.S. Cl. ................................. 264/171; 264/119; 264/130; 264/258; 264/331.16; 264/331.19; 264/338
[58] Field of Search ........... 264/171, 130, 119, 331.16, 264/338, 331.19, 258

[56] References Cited

U.S. PATENT DOCUMENTS

| | | | |
|---|---|---|---|
| 3,093,255 | 6/1963 | Mesrobian et al. | 525/184 |
| 3,373,223 | 3/1968 | Armstrong | 525/184 |
| 3,383,448 | 5/1968 | Bader et al. | 264/171 |
| 3,472,916 | 10/1969 | Anspon et al. | 525/184 |
| 3,516,961 | 6/1970 | Robb | 525/184 |
| 3,626,026 | 12/1971 | Fukumura et al. | 525/184 |
| 3,701,748 | 10/1972 | Kroekel | 264/331.18 |
| 3,801,693 | 4/1974 | Stallings et al. | 264/338 |
| 3,873,667 | 3/1975 | Preto et al. | 525/184 |
| 3,894,134 | 7/1975 | Williams | 264/171 |
| 3,923,726 | 12/1975 | Benz | 525/184 |
| 3,971,866 | 7/1976 | Johnson | 428/40 |
| 3,972,977 | 8/1976 | Fry | 264/331.16 |
| 4,088,808 | 5/1978 | Cornwell et al. | 264/338 |
| 4,149,920 | 4/1979 | Ealding et al. | 264/171 |

FOREIGN PATENT DOCUMENTS

2140041  2/1973  Fed. Rep. of Germany.

OTHER PUBLICATIONS

*Modern Plastics Encyclopedia*, vol. 54 (10A), p. 364, 1977–1978, McGraw-Hill.

*Primary Examiner*—Jeffery Thurlow
*Attorney, Agent, or Firm*—Richard A. Negin; Patrick L. Henry

[57] ABSTRACT

Disclosed is a polyamide film of low crystallinity suitable for use in the manufacture of sheet molding compound (SMC). The sheet is produced from a blend comprising a polyamide selected from the group consisting of polyepsiloncaprolactam, polyhexamethylene adipamide or mixtures thereof, and about 10 to 30 wt. %, based on the total weight of said blend, of a polyolefin compound, or copolymer thereof, such as ethylene-vinyl acetate copolymer. The film has a tear strength of at least about 400 grams in the longitudinal direction as measured by ASTM D-1004-66.

13 Claims, 1 Drawing Figure

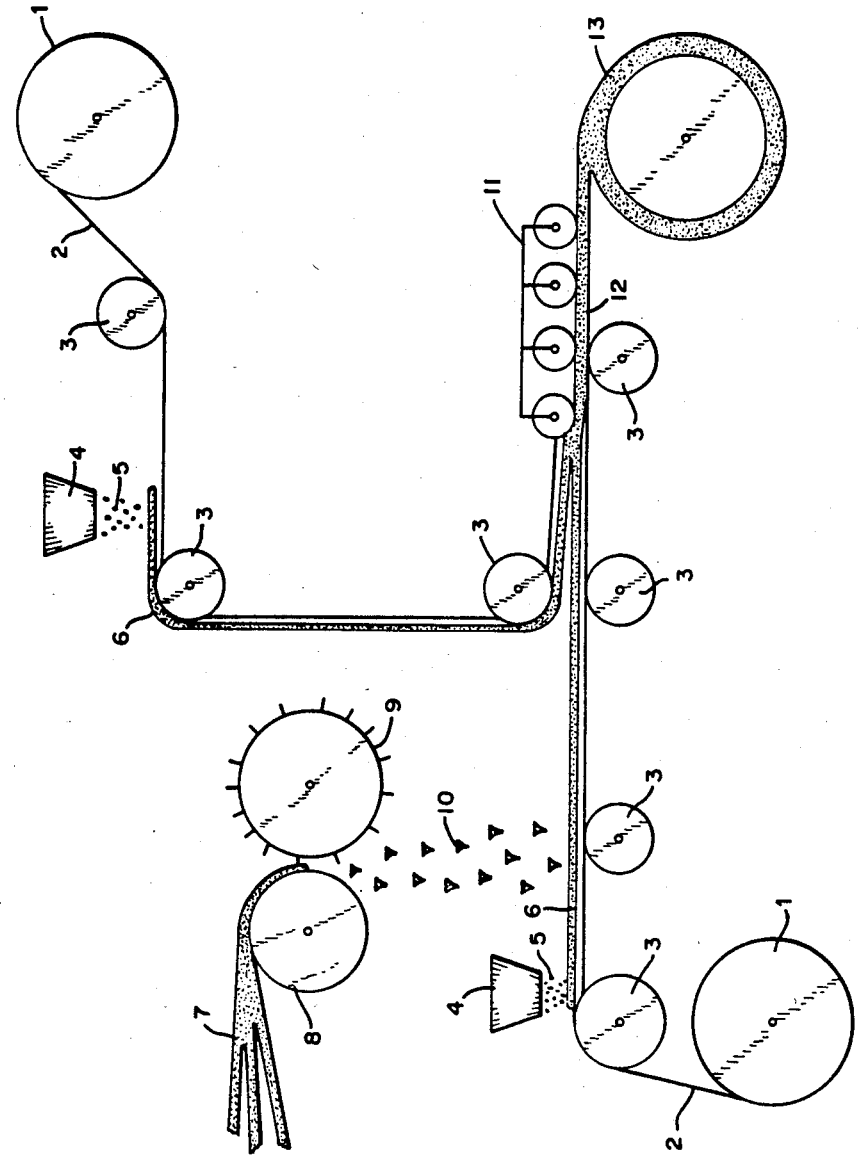

PROCESS TO PRODUCE SHEET MOLDING COMPOUND USING A POLYAMIDE RELEASE FILM

This application is a division of application Ser. No. 218,888, filed Dec. 22, 1980 now U.S. Pat. No. 4,444,829, issued Apr. 24, 1984 which is a continuation of Ser. No. 083,502, filed Oct. 10, 1979, now abandoned.

DESCRIPTION

1. Field of the Invention

This invention relates to blended polyamide/polyolefin film, of low crystallinity, suitable for use in the preparation of sheet molding compound.

2. Background of the Invention

A considerable amount of effort and progress is being made in the technology of reinforcing plastics. Spurred mainly by the need of the automobile industry to produce lighter weight, more energy-efficient automobiles, much of the present activity in this field has been devoted to producing plastics with enough strength and durability to replace many of the metal structural support members of the auto body. The reinforced plastic part must exhibit similar structural strength and integrity as the metal component while simultaneously reducing its weight at equal, or preferably, lower cost. As a result, a large amount of activity in developing high strength structural composites has been devoted to upgrading sheet molding compound (SMC), which allows relatively fast matched-die molding methods.

SMC is generally comprised of crosslinkable polymeric resin, particularly unsaturated polyester, particulate filler, chopped fiber reinforcement, as well as various other additives in minor amounts. This composite material is usually prepared by depositing the chopped fiber on a layer of fluid resin supported on a moving polyethylene film, then placing another layer of polyethylene film on top to form a sandwiched composite which is passed through a series of kneading and compaction rolls and is usually wound into large rolls. These rolls are usually wrapped with aluminum foil to prevent loss of monomer, usually styrene, which acts as a cross-linking agent for the polyester resin. After a maturation period, of about 2-5 days during which the polyester partially cures and increases in viscosity to a moldable consistency, the SMC is used to produce molded parts for automobiles, boats, etc., by cutting a piece of appropriate size from the roll, peeling away the polyethylene carrier film, and placing the SMC in a heated mold for simultaneous molding and complete curing. Thus, SMC sandwich composites are finding ready application in compression molding procedures, and particularly in matched die molding operations.

However, during manufacture of the sandwich structure and subsequent storage of the SMC roll, loss of styrene monomer occurs through the polyethylene film since it is relatively permeable, which results in poor product flow and unacceptable molded parts, as well as creating an odor and health hazard in the SMC manufacturing line and storage area. In addition, polyethylene film even though it has good peelability for SMC, has a low tear strength which results in tearing and stretching of the film during the SMC manufacturing process which results in process interruption and down time which increases the cost of the process. Therefore, there is a need for a film suitable for use in the production of SMC sandwich composites that will be relatively impermeable to styrene monomer, have good release properties and be resistant to tearing during the operation of manufacturing the SMC sandwich composite.

SUMMARY OF THE INVENTION

We have unexpectedly found that a film comprising a blend of polyamide and about 10-30 wt.% polyolefin component, or copolymer thereof, and exhibiting low crystallinity, is an excellent carrier film for producing sandwich composites of SMC. The polyamide component of the film provides good tear strength and excellent styrene impermeability, while the polyolefin component provides good peelability of the film.

In a preferred embodiment, the film is comprised of a blend of polycaprolactam and about 10-15 wt. percent of ethylene/vinyl acetate copolymer and about 0.5 to 1.0 wt. percent of the blend, of particulate titanium dioxide filler. The titanium dioxide is preferably present to distinguish the film layer from the SMC such that the peelability, i.e. the amount of SMC adhering to the film can be easily determined visually.

In addition, the film preferably has a Graves tear strength of at least about 400 grams, a styrene permeability of below about $200 \times 10^{-9}$ g-cm/cm$^2$-/hr, and a peelability such that after peeling, the carrier film has SMC adhered to less than 5% of its surface area.

In accordance with this invention, there is provided in a process for producing sheet molding compound comprising:

(a) casting a layer of heat-curable thermosetting resin, in fluid form, onto a continuously advancing polymeric film;

(b) introducing reinforcing material onto the advancing fluid layer;

(c) contacting a polymeric film to the top surface of said reinforced fluid layer thereby forming a sandwiched composite;

(d) advancing said sandwiched composite through a series of kneading and compaction rolls, and (e) winding the sandwiched composite into a roll for partial curing;

the improvement which comprises using as the polymeric film a low crystallinity polyamide film, of about 0.5 to 5 mils thick, comprised of a blend of polyhexamethylene adipamide, polyepsiloncaprolactam, or mixtures thereof, and about 10 to 30 percent by weight of said blend, of a polyolefin component, or copolymer thereof, wherein said film, exhibits (a) a Graves tear strength of at least about 400 grams in the longitudinal direction, as determined by ASTM-D-1004-66; (b) a styrene permeability of below about $200 \times 10^{-9}$ g.-cm/cm$^2$-hr., and (c) a peelability such that after maintaining said sandwiched composite at 26°-32° C. for 3 days, less than 5 percent of the contacting surface of said film has adhered sheet molding compound thereto, after peeling.

Further provided is an SMC sandwich composite produced by the above-described subject process.

In addition there is provided a polyamide film for use in the manufacture of sheet molding compound wherein said film is of low crystallinity and comprised of a blend of polyepsiloncaprolactam, polyhexamethylene adipamide, or mixtures thereof, and about 10 to 30 weight percent of the blend of polyolefin component, or copolymer thereof, wherein said film is about 0.5 to 5 mils thick and exhibits (a) a Graves tear strength of at least about 400 grams in the longitudinal direction, as determinted by ASTM-D-1004-66; and (b) a styrene permeability of below about $200 \times 10^{-9}$ g.-cm/cm$^2$-hr.

BRIEF DESCRIPTION OF THE DRAWING

The FIGURE illustrates a preferred embodiment in the process for producing SMC sandwich composites. Shown are film layers having SMC resin deposited thereon, chopped fiber being deposited thereon, and the sandwich composite being formed, compacted and wound.

DESCRIPTION OF THE PREFERRED EMBODIMENT

Polyamides suitable for use in producing the subject film include low crystallinity polyepsiloncaprolactam, or "polycaprolactam" as used herein, polyhexamethylene adipamide, or mixtures thereof, having a viscosity average molecular weight of at least about 10,000 and preferably from about 15,000 to 40,000. The formic acid viscosity (FAV) is generally in the region of about 50 to 200 and preferably about 70 to 130. Generally, the polyamide component is present in about 90–70 weight percent of the blend comprising the film, and preferably about 90–85% by weight of the blend.

In the context of the present invention, by the term "polyolefin component", is meant completely or substantially linear high molecular weight polymers of alpha-olefins, for example polyethylene, polypropylene or polyisobutylene, and copolymers of alpha-olefins with vinyl acetate monomers, for example ethylene/vinyl acetate copolymer, or alkyl acrylates such as ethylene methylacrylate or ethylene/ethylacrylate copolymers. The above polyolefins can be obtained by any of the usual processes, for example by "high pressure polymerization" (U.K. Pat. No. 471,590) by "low-pressure polymerization" (West German Pat. No. 973,626) in the presence of Ziegler catalysts, or by radically initiated bulk, suspension or emulsion polymerization. The polyolefin component is preferably of low crystallinity with a molecular weight of about 1,000 to 1,000,000, and preferably about 10,000 to 500,000. This corresponds to a melt flow index (M.F.I.) of about 0.1 to 300 in standard units. Preferred polyolefin component in the subject film is ethylene/vinyl acetate copolymer.

The film of the present invention can be prepared by thoroughly blending together the polyamide, about 10 to 30 wt. %, preferably about 10 to 15 wt. % of polyolefin component, and various minor amounts of conventionally used additives such as pigments, heat stabilizers, antistatic agents, and the like, followed by hot melt extrusion. Preferably a white pigment such as titanium dioxide, present in about 0.25 to 2.0 weight percent of the blend, and preferably present in about 0.5 to 1.5 weight percent of the blend, is used so that it can easily be determined that all of the release film has been removed from the SMC.

Generally, it is preferred to utilize the titanium dioxide as a dispersion in the polyolefin component to be used. Preferably, the titanium dioxide is utilized as a 40 weight percent dispersion in ethylene/vinyl acetate copolymer having a melt flow index of about 1 to 10 standard units.

Representative examples of suitable blending devices for forming the blend include drum tumblers, Banbury mixers, twin screw extruders, and heated roll mills. The temperature of the blending step is usually conducted at about ambient temperature. The blend is then charged into a hot melt extruder equipped with a film-forming die, and the resulting film, being of a thickness from about 0.5 to 5 mils, preferably from about 0.75 to 2 mils, is passed onto a casting roll maintained at a temperature from about 50° to 90° C., and preferably about 70° to 80° C. It will be noted that the temperature of the casting roll is important so that the polyamide portion of the resulting film be substantially in a low crystallinity range for good tear strength. A desired crystallinity of the film is less than about 35%, and preferably less than about 25%.

By the term "low crystallinity", as used herein, is meant the measurable crystallinity of the main component, the polyamide component. The crystallinity of the polyamide component is determined by conventional X-ray diffraction techniques; where the polyamide is polycaprolactam, the method used is that described in the reference Journal of Polymer Science, Vol. B(1), p. 603 (1963), by L. Roldan, hereby incorporated by reference. This technique measures the amount of "gamma crystallinity", which is specific to polycaprolactam. If the polyamide is polyhexamethylene diamine adipamide, the method described in the reference "Nylon Plastics", Chapter 8, J. Wiley and Sons, New York, 1973, is used. If the film is comprised of a blend of both of the above polyamides, both of these methods can be used to determine the total polyamide crystallinity. The reason why a low polyamide crystallinity is desired is that the tear strength of the film, is a function of low crystallinity, i.e. the lower the crystallinity, the greater the tear strength.

As described above, the film must possess a polyamide crystallinity of less than about 35% and preferably of about 10 to 25% for good tear strength properties.

The crystallinity of the polyolefin component should also be of a low value and should be below about 70% and preferably 20 to 50%. Measurements of the crystallinity can be determined by the known techniques of density or X-ray measurements.

By the term "tear strength", as used herein, is meant the Graves tear strength, as determined by ASTM D-1004-66, and is a measure of the force expressed in grams needed to tear the film under standardized conditions. The film should have a tear strength of at least about 400 grams, and preferably from 400–700 grams.

The film should also have a styrene permeability of below about $200 \times 10^{-9}$ g-cm/cm$^2$-hr., as determined by the method described in the reference, American Institute of Chemical Engineers, 53rd National Meeting, Preprint No. 32d, 1964, by Bixler and Michaels, hereby incorporated by reference. By the term "styrene permeability" is meant the value of P, correctly termed "permeability factor", in the equation: $P = QL/A$ (grams-cm./cm$^2$-hr.) where Q = weight loss in grams/hr.
L = thickness of the film in cm.
A = area of the film tested in cm$^2$.

The method as described in the above reference, includes contacting a film of measured thickness with liquid styrene monomer in a cup apparatus at 23° C. A stream of air is directed over the film and a plot of cup weight versus time is constructed. After a steady state is reached, the value of Q is obtained from which P can be calculated. An acceptable value for plant operation would be $200 \times 10^{-9}$ g-cm/cm$^2$-hr. and preferably, of about 0.1 to $100 \times 10^{-9}$ g-cm/cm$^2$-hr to facilitate maintaining plant air quality within OSHA requirements.

The film should also exhibit a peel adhesion or "peelability" such that the film peels off easily from the SMC material prior to molding with only minor amounts of SMC adhered to the film contacting surface. Preferably, the extent of adhering of the SMC to the film surface should be about 5% of each film surface, i.e. upper and lower film surfaces, or below for acceptable performance. The peelability test is conducted by maintaining the SMC sandwich composite at 26°-32° C. for 3 days and then peeling off the film and visually observing the amount of SMC adhered thereto the contacting film surface.

Thus, also a subject of this invention is a polyamide film for use in the manufacture of sheet molding compound sandwiched composites wherein said film is of low crystallinity and comprised of a blend of polyepsiloncaprolactam, polyhexamethylene adipamide, or mixtures thereof, and about 10 to 30 weight percent of the blend of polyolefin component, or copolymer thereof, wherein said film is about 0.5 to 5 mils thick and exhibits (a) a Graves tear strength of at least about 400 grams in the longitudinal direction, as determined by ASTM-D-1004-66; and (b) a styrene permeability of below about $200 \times 10^{-9}$ g.cm/cm$^2$-hr.

Preferred is where said polyamide is polyepsiloncaprolactam, said polyolefin component is ethylene/vinyl acetate copolymer, present in about 10–15 weight percent of the blend and said film having a Graves tear strength of at least about 400 up to about 800 grams.

Particularly preferred is where said blend also contains up to about 1.0 weight percent of titanium dioxide filler, based on the weight of said blend.

A general description of the subject process can be given by referral to the FIGURE. Storage rolls 1 release stored film 2 onto carrier/conveyor rolls 3 which transport the subject film 2 throughout the sandwich-forming process. Dispensers 4 deposit fluid SMC resin/filler paste 5 onto film 2 forming resin filler layer 6. In the FIGURE, to the bottom layer 6, glass reinforcement is added whereby continuous strand roving 7 is guided and advanced by roller 8 positioned in relation to cutter 9 such that the roving strand 7 is chopped into smaller size reinforcing pieces 10, of about 1" in length which are then deposited onto layer 6 of the advancing coated film. The layered film is collected on mandrel 13 to form a roll of SMC sandwich of composite.

The above-described embodiment is the usual method of producing SMC sandwich composite, in which the carrier film has been preformed in a separate step, stored, and is then removed and used in the process. An alternate process would be where the film is produced in two different film extrusion/casting operations and utilized directly to make SMC sandwich composite. In practice, the distance from lower roll 1 to the mandrel 13, is actually very long being up to about 30 or more feet. This however, is determined by plant size and other operating factors obvious to one skilled in the art.

The novelty in the subject process is the use of the subject nylon/polyolefin film as a carrier-liner film for producing SMC sandwiched composite, which possesses the desirable qualities needed for effective utilization of SMC on a commercial scale. The operating variables with respect to type of apparatus, speed of the film, and temperatures employed in the process are all well known in the art and need not be reiterated. An excellent description of the general process using polyethylene as the filler carrier can be found in "Handbook of Technology and Engineering of Reinforced Plastics/composites, pp. 207–237, Van Nostrand Reinhold, New York, 1973, hereby incorporated by reference.

A typical SMC compound used to produce automotive parts generally contains the following components; resin—formed from (1) unsaturated acids or acid anhydrides such as fumaric acid and/or maleic anhydride combined with (2) saturated acids or acid anhydrides such as phthalic anhydride and/or isophthalic acid or adipic acid reacted with (3) glycols or diglycols such as ethylene glycol, propylene glycol, diethylene glycol or dipropylene glycol; crosslinking monomer such as styrene or vinyl toluene; catalyst—peroxides or peracids such as t-butyl perbenzoate; catalyst activator—metallic soaps such as zinc stearate; mineral extenders or filler—e.g. calcium carbonate; pigment—e.g. iron oxide; and thickening agent—e.g. magnesium hydroxide. An example of the amounts of these components is:

| resin and monomer | 100 parts |
| catalyst | 1 part |
| catalyst activator | 3 parts |
| filler | 150 parts |
| pigment | 3 parts |
| thickening agent | 3.8 parts |

To this resin mixture, chopped glass fiber, of about 1 to 2 inches in size, and/or other fibrous reinforcements such as carbon or metal fiber are added.

Thus, also a subject of this invention is in a process for producing sheet molding compound comprising:
 (a) casting a layer of heat-curable thermosetting resin, in fluid form, onto a continuously advancing polymeric film;
 (b) introducing reinforcing material onto the advancing fluid layer;
 (c) contacting a polymeric film to the top surface of said reinforced fluid layer thereby forming a sandwiched composite;
 (d) advancing said sandwiched composite through a series of kneading and compaction rolls, and
 (e) winding the sandwiched composite into a roll for partial curing;
 the improvement which comprises using as the polymeric film a low crystallinity polyamide film, of about 0.5 to 5 mils thick, comprised of a blend of polyhexamethylene adipamide, polyepsiloncaprolactam, or mixtures thereof, and about 10 to 30 percent by weight of said blend, of a polyolefin component, or copolymer thereof, wherein said film, exhibits (a) a Graves tear strength of at least about 400 grams in the longitudinal direction, as determined by ASTM-D-1004-66; (b) a styrene permeability of below about $200 \times 10^{-9}$ g.-cm./cm$^2$hr., and (c) a peelability such that after maintaining said sandwiched composite at 26°-32° C. for 3 days, less than 5 percent of the contacting surface of said film has adhered sheet molding compound thereto, after peeling.

Preferred is where the improvement comprises using as the polymeric film a low crystallinity polyamide film, of about 0.5 to 5 mils thick, comprised of a blend of polyepsiloncaprolactam and about 10 to 30 percent by weight of said blend, of ethylene/vinyl acetate copolymer, wherein said film exhibits (a) a Graves tear strength of at least about 400 grams in the longitudinal direction, as determined by ASTM-D 1004-66; (b) a styrene permeability of below about $100 \times 10^{-9}$ g-cm/cm$^2$-hr.; and (c) a peelability such that after maintaining said sandwich structure at 26°-32° C. for 3 days, less than 5 percent of the contacting surface of said fiber has adhered sheet molding compound thereto, after peeling.

Also a subject of this invention is an SMC sandwich structure produced by the above-described process incorporating the above-described film.

The following examples are illustrative of the best mode of carrying out the invention as contemplated by us and should not be construed as being limitations on the scope or spirit of the instant invention.

EXAMPLE 1

201 Kg of polyepsiloncaprolactam (having a relative viscosity of 73 measured in 90% formic acid at a concentration of 9.2% by weight) was blended in a drum tumbler with 22.6 Kg of ethylene/vinyl acetate copolymer containing 9% vinyl acetate (having a M.F.I. of 3) and 1.36 Kg of 40% titanium dioxide dispersion in ethylene/vinyl acetate. This blend, corresponding to about 10% by weight of ethylene/vinyl acetate, was charged to a 3½ inch diameter (30:1 length to diameter ratio) single screw extruder equipped with a Maddox mixing screw and a 65 inch wide flat film die. The extruder was maintained at a temperature of 257° to 270° C. from feedport to die with the die maintained at about 260° C. The molten blend was extruded at 75 RPM with an output of 275 lbs/hr. The molten blend was then extruded onto a casting roll maintained at 80° C. where it was drawn to a film thickness of 1 mil. The resulting film was then wound onto a roll using a double shaft winder. The resulting film exhibited a Graves tear strength of 700 grams, and a styrene permeability of about $3 \times 10^{-9}$ g.cm/cm$^2$-hr. The gamma crystallinity of the polycaprolactam component was 24%.

The resulting film was then utilized as a carrier film for forming a sandwich composite with SMC. Onto the above-described film, in a continuously advancing fashion, was deposited fluid, standard SMC containing:

100 parts Owens-Corning resin E-920-1, containing:
40 parts styrene monomer,
150 parts calcium carbonate,
3 parts zinc stearate,
1 part tertiary-butyl benzoate
3 parts iron oxide, and
3.8 parts magnesium hydroxide Glass fiber, of 1 inch length was then deposited onto the fluid layer, forming the sheet molding compound. To the surface of the fluid layer was deposited another layer of the above-described blended nylon film to form a sandwiched composite. The formed composite was then wound in a roll for storing. The shelf life of the sheet molding compound in the prepared sandwiched composite utilizing nylon/ethylene vinylacetate carrier film, was compared with identical sheet molding compound made using polyethylene carrier film of the same thickness. After one week at 32° C., the SMC having polyethylene as the carrier film, was found to be hard and nonformable, evidence of styrene loss whereas even after three weeks the SMC having the nylon carrier film was still soft and pliable and could be satisfactorily compression molded.

EXAMPLE 2

A series of eight films of 1 mil thickness were produced following the procedure and using the apparatus described in Example 1 except that the amount of ethylene/vinyl acetate used in the blend was varied in the range from 0 to 40% by weight. The resulting films were tested for Graves tear strength according to ASTM D-1004-66, in the machine and transverse directions. The results are shown below in Table I for the machine direction.

In addition, the peelability of the resulting films was also tested, from SMC sandwiched composites, produced as described by the method in Example 1. The resulting SMC sandwiched composites were maintained in an oven for 3 days at 26° to 32° C. and the EVA/polyamide carrier film separated by peeling by hand. The peelability was based on an objective evaluation of the amount of SMC compound which adhered to the contacting film surface viz:

| Peelability Ranking | % Film Surface Area Having Retained SMC |
| --- | --- |
| poor | 20 to 30% or more |
| good | 5% or less |
| excellent | essentially nil |

The results of the peelability are shown below in Table I.

TABLE I

E/VA - Polycaprolactam Films

| Run | Wt. % EVA | Peelability | Machine Direction Graves Tear Strength grams |
| --- | --- | --- | --- |
| 1 | 0 | poor | 624 |
| 2 | 5 | poor | 690 |
| 3 | 10 | good | 788 |
| 4 | 15 | good | 720 |
| 5 | 20 | excellent | 580 |
| 6 | 25 | excellent | 530 |
| 7 | 30 | excellent | 450 |
| 8 | 40 | excellent | less than 400 |

Note that only films with about 10 to 30% by weight E/VA, (Runs 3–7) exhibited good to excellent peelability while the Graves tear strength in the machine direction declined to less than 400 grams at a 40% by weight level of E/VA.

EXAMPLE 3

A series of films were made following the procedure of Example 1 by extruding mixtures of polyepsiloncaprolactam blended with 0 to 30% by weight of low density polyethylene having a melt flow index (M.F.I.) of 3.5. Graves tear tests were made on 1 mil films extruded from these mixtures and peelability tests were made on SMC sandwich composites prepared according to the procedure in Example 1. The results are shown below in Table II.

TABLE II

Polyethylene/Polycaprolactam Films

| Run | Wt. % Polyethylene | Peelability | Machine Direction Graves Tear Strength grams |
| --- | --- | --- | --- |
| 1 | 0 | poor | 624 |
| 2 | 10 | good | 720 |
| 3 | 15 | good | 680 |
| 4 | 20 | excellent | 530 |
| 5 | 25 | excellent | 530 |
| 6 | 30 | excellent | about 400 |

Results in Table II show that good to excellent peel characteristics were obtained between 10 and 30% by weight low density polyethylene in the blends while at 30% by weight composition the tear strength was marginal but still acceptable.

EXAMPLE 4

Following the procedure of Example 1, 1 mil thick films were made from the following compositions: polycaprolactam/10 weight % E/VA and 1.5 weight % TiO$_2$; and polyhexamethylene adipamide/10 weight % E/VA and 1.5 weight % TiO$_2$.

Both films exhibited Graves tear strengths of 720 and 750 grams, respectively. SMC sandwiched composites were prepared from the films according to the procedure of Example 1, and both films exhibited good peel strength by the test described in Example 2.

EXAMPLE 5

1 Mil films were produced according to the procedure of Example 1, from 20% E/VA by weight and polycaprolactam; 20% by weight ethylene/ethyl acetate (EEA) and polycaprolactam; 20% by weight polypropylene (M.F.I=3) and polycaprolactam; and were tested for permeability to liquid styrene monomer compared to 1 mil unmodified polycaprolactam film and to 2 mil low density (M.F.I.=2) unmodified polyethylene film.

Measurements of the styrene permeability of the films were made by the method of Bixlar and Michaels described hereinabove. Results are shown below in Table III.

TABLE III

| Styrene Monomer Liquid Permeability at 25° C. in $10^{-9}$ grams - cm/cm$^2$-hr. | |
| --- | --- |
| 20% E/VA; polycaprolactam (1 mil) | 8 |
| unmodified polycaprolactam (1 mil) | 9 |
| 20% EEA; polycaprolactam (1 mil) | 27 |
| 20% polypropylene; polycaprolactam (1 mil) | 42 |
| low density polyethylene (2 mils) | 28000 |

Note that the addition of 20% by weight E/VA, EEA or polypropylene had little effect on styrene permeability, very low values being obtained for both unmodified and modified polycaprolactam films while styrene permeability for low density polyethylene was about 3000 times higher.

EXAMPLE 6

Following the procedure of Example 1, two films, designated A and B, were produced from a blend of polycaprolactam, 10% by weight of ethylene-vinyl acetate copolymer, and 1.5% by weight of the blend, of pigmented ethylene-vinyl acetate containing titanium dioxide, but using different casting roll temperatures during film formation.

Sample A was produced using a casting roll temperature of 80° C., while Sample B was extruded at a casting roll temperature of 105° C. Graves tear tests were made on both samples with the following results:

Sample A-640 grams in the machine direction
Sample B-340 grams in the machine direction Thus, it is evident that higher casting roll temperatures presumably result in higher crystallinity films having unacceptable Graves tear strengths.

EXAMPLE 7

Since the presence of both the ethylene/vinyl acetate copolymer (which has some polyethylene crystallinity) and titanium dioxide, which is also a crystalline compound, make a direct determination of the crystallinity level of the polyamide component difficult in the subject film, this level was determined indirectly.

Samples of film were produced from polycaprolactam alone, without the EVA and titanium dioxide components, by using casting roll temperatures in the range of 50° to 90° C. Measurements of the x-ray crystallinity of the gamma form present in the resulting polycaprolactam were made following the procedure described hereinabove. Values of less than 35% crystallinity were attained. In the preferred casting roll temperature range of 75° to 80° C., the crystallinity levels were less than 25%. The Graves tear strength values for the above-produced films were in the range of 600 to 700 grams.

We claim:

1. In a process for producing sheet molding compound comprising:
   (a) casting a layer of heat-curable thermosetting resin, in fluid form, onto a continuously advancing polymeric film;
   (b) introducing reinforcing material onto the advancing fluid layer;
   (c) contacting a polymeric film to the top surface of said reinforced fluid layer thereby forming a sandwiched composite;
   (d) advancing said sandwiched composite through a series of kneading and compaction rolls, and
   (e) winding the sandwiched composite into a roll for partial curing;
   the improvement which comprises using as the polymeric film a low crystallinity polyamide film, of about 0.5 to 5 mils thick, comprised of a blend of a polyamide selected from the group consisting of polyhexamethylene adipamide, polyepsiloncaprolactam, and mixtures thereof, the polyamide having a crystallinity of less than 35%, and about 10 to 30 percent by weight of said blend, of a polyolefin component, or copolymer thereof, the polyolefin having a crystallinity of less than 50%, wherein said film, exhibits (a) a Graves tear strength of at least about 400 grams in the longitudinal direction, as determined by ASTM D-1004-66; (b) a styrene permeability of below about $200 \times 10^{-9}$ g.cm/cm$^2$-hr., and (c) peelability such that after maintaining said sandwich structure at 26°-32° C. for 3 days, less than 5 percent of the contacting surface of said film has sheet molding compound adhered thereto, after peeling.

2. The process of claim 1 wherein said polyamide is polyepsiloncaprolactam.

3. The process of claim 1 wherein said polyolefin component, or copolymer thereof, is selected from polyethylene, polypropylene, ethylene/vinyl acetate copolymer, ethylene/ethyl acrylate copolymer, ethylene/methyl acrylate copolymer, or mixtures thereof.

4. The process of claim 3 wherein said polyolefin copolymer is ethylene/vinyl acetate copolymer.

5. The process of claim 1 wherein said polyolefin component is present in about 10-15 wt. percent based on the weight of the blend.

6. The process of claim 1 wherein said Graves tear strength is about 400 to 800 grams.

7. The process of claim 1 wherein said film has a styrene permeability of about 0.1 to $200 \times 10^{-9}$ g-cm./cm$^2$-hr.

8. The process of claim 1 wherein said film exhibits a polyamide crystallinity of below about 35%.

9. The process of claim 1 wherein said blend further comprises 0.25 to 2.0 weight percent titanium dioxide filler.

10. The process of claim 1 wherein said polyamide is polyepsiloncaprolactam, said polyolefin component is ethylene/vinyl acetate copolymer, present in about 10–15 weight percent of the blend.

11. In a process for producing sheet molding compound comprising:
  (a) casting a layer of heat-curable thermosetting resin, in fluid form, onto a continuously advancing polymeric film;
  (b) introducing reinforcing material onto the advancing fluid layer;
  (c) contacting a polymeric film to the surface of said reinforced fluid layer thereby forming a sandwiched structure;
  (d) advancing said sandwich structure through a series of kneading and compaction rolls; and
  (e) winding the sandwich structure into a roll for partial curing;
  the improvement which comprises using as the polymeric film an amorphous polyamide film, of about 0.5 to 5 mils thick, comprised of a blend of polyepsiloncaprolactam having a crystallinity of less than 35% and about 10 to 30 percent by weight of said blend, of ethylene/vinyl acetate copolymer having a crystallinity of less than 50%, wherein said film exhibits (a) a Graves tear strength of at least about 400 grams in the longitudinal direction, as determined by ASTM-D 1004-66; (b) a styrene permeability of below about $100 \times 10^{-9}$ g-cm/cm$^2$-hr.; and (c) a peelability such that such that after maintaining said sandwich structure at 26°–32° C. for 3 days, less than 5 percent of the contacting surface of said film has sheet molding compound adhered thereto after peeling.

12. An improved process for producing sheet molding compounds of the type wherein a layer of heat curable thermosetting resin is fed onto a polymeric film, and forming the composition into a sheet, the improvement comprising using a polymeric film which comprises a polyamide film of low crystallinity of 0.5 to 5.0 mils thick comprised of a blend of a polyamide selected from the group consisting of polyepsiloncaprolactam, polyhexamethylene adipamide, and mixtures thereof, the polyamide having a crystallinity of less than 35%, and about 10 to 30 weight percent of the blend of polyolefin component, or copolymer thereof, the polyolefin having a crystallinity of less than 50%, wherein said film exhibits (a) a Graves tear strength of at least about 400 grams in the longitudinal direction, as determined by ASTM-D 1004-66; (b) a styrene permeability of below about $100 \times 10^{-9}$ g-cm/cm$^2$-hr.; and (c) a peelability such that after maintaining a sandwich structure at 26°–32° C. for three days, less than 5 percent of the contacting surface of said film has sheet molding compound adhered thereto after peeling.

13. The process of claim 12 further comprising forming a sandwich composite.

* * * * *